(12) United States Patent
Wang et al.

(10) Patent No.: US 9,959,650 B2
(45) Date of Patent: May 1, 2018

(54) METHOD AND DEVICE FOR MERGING GRAPHIC LAYERS

(71) Applicant: VIA Alliance Semiconductor Co., Ltd., Shanghai (CN)

(72) Inventors: Yanjie Wang, Shanghai (CN); Chenyang Zhu, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 112 days.

(21) Appl. No.: 15/160,855

(22) Filed: May 20, 2016

(65) Prior Publication Data

US 2017/0154447 A1 Jun. 1, 2017

(30) Foreign Application Priority Data

Dec. 1, 2015 (CN) .......................... 2015 1 0869063

(51) Int. Cl.
*G06T 11/60* (2006.01)
*G06T 15/50* (2011.01)
*G06T 15/00* (2011.01)

(52) U.S. Cl.
CPC ............ *G06T 11/60* (2013.01); *G06T 15/503* (2013.01)

(58) Field of Classification Search
CPC .................................. G06T 11/60; G06T 1/20
See application file for complete search history.

(56) References Cited

U.S. PATENT DOCUMENTS

| 2008/0278519 A1* | 11/2008 | Mao | G09G 5/14 345/629 |
| 2013/0328922 A1* | 12/2013 | Belanger | G06T 11/00 345/629 |
| 2016/0073155 A1* | 3/2016 | Subramaniam | H04N 21/4316 725/32 |

* cited by examiner

*Primary Examiner* — Samantha (Yuehan) Wang
(74) *Attorney, Agent, or Firm* — McClure, Qualey & Rodack, LLP

(57) ABSTRACT

A method for merging graphic layers is provided. The method includes: receiving a plurality of graphic layers in a current frame; assigning sequence numbers to the graphic layers according to an overlay order; judging whether a first graphic layer and a second graphic layer vary in a period; merging the first graphic layer with the second graphic layer when judging that the first graphic layer and the second graphic layer do not vary in the period; and displaying the graphic layers in order of the sequence numbers according to the sequence numbers, wherein the first graphic layer and the second graphic layer are adjacent graphic layers.

28 Claims, 7 Drawing Sheets

METHOD AND DEVICE FOR MERGING GRAPHIC LAYERS

CROSS REFERENCE TO RELATED APPLICATIONS

This application claims priority to Chinese Patent Application No. 201510869063.5 filed on Dec. 1, 2015 in the China Intellectual Property Office, the contents of which are incorporated by reference herein.

BACKGROUND OF THE INVENTION

Field of the Invention

Aspects of the present invention relate generally to a method and a device for merging graphic layers, and more particularly, to a method and a device for merging graphic layers on an Android platform.

Description of the Related Art

In the field of mobile devices, multimedia video playback functions have become an essential requirement.

In a multimedia video playback system applied in an Android platform, a hardware composer (Hwcomposer) sequentially processes graphic layers transmitted from a SurfaceFlinger. A traditional implementation is for the Hwcomposer to process the graphic layers sequentially in the Z-axis direction, and then to tag each graphic layer according to a priority of overlay, bit-block transfer (blit) and fallback. However, a disadvantage of this implementation is that the Hwcomposer has to processes the graphic layers according to the order in which the graphic layers are transmitted from the SurfaceFlinger.

When the number of source graphic layers is greater than the number of streams supported by the display interface units (DIU), the source graphic layers need to be merged. To ensure that the overlay order is correct, only adjacent graphic layers can be merged. A traditional method may be for the graphic layers to be sequentially merged from the highest graphic layer to the lower graphic layer in the Z-axis direction, or the graphic layers are sequentially merged from the lowest graphic layer to the higher graphic layer in the Z-axis direction, until the number of graphic layers matches the number of streams. The disadvantage of this method is that it is reliant on the Z-axis order of the graphic layers; therefore, the method may not be providing the optimal performance.

In addition, the traditional Hwcomposer may use a large number of streams to achieve optimal performance. However, power consumption of the DIU is positively correlated to the number of streams. This causes high power consumption.

As the foregoing illustrates, a new method and a device for displaying and merging graphic layers in the Android platform may be desirable.

BRIEF SUMMARY OF THE INVENTION

A detailed description is given in the following embodiments with reference to the accompanying drawings.

A method and a device for merging graphic layers are provided.

In a preferred embodiment, the invention is directed to a method for merging graphic layers, comprising: receiving a plurality of graphic layers in a current frame; assigning sequence numbers to the graphic layers according to an overlay order; judging whether a first graphic layer and a second graphic layer vary in a period; merging the first graphic layer with the second graphic layer when judging that the first graphic layer and the second graphic layer do not vary in the period; and displaying the graphic layers in order of the sequence numbers, wherein the first graphic layer and the second graphic layer are adjacent graphic layers.

In a preferred embodiment, the invention is directed to a method for merging graphic layers, comprising: receiving a plurality of graphic layers in a current frame; assigning sequence numbers to the graphic layers according to an overlay order; assigning a weight value to each graphic layer according to a manner; establishing a layer order according to the sequence numbers and the weight values; judging whether a first graphic layer and a second graphic layer vary in a period; and merging the first graphic layer with the second graphic layer when judging that the first graphic layer and the second graphic layer do not vary in the period; wherein the first graphic layer and the second graphic layer are adjacent graphic layers.

In a preferred embodiment, the invention is directed to a device for merging graphic layers. The device comprises a control circuit, a processor and a memory. The processor is installed in the control circuit. The memory is installed in the control circuit and is operatively coupled to the processor. The processor is configured to execute a program code stored in the memory to instruct a hardware composer to: receive a plurality of graphic layers in a current frame; assign sequence numbers to the graphic layers according to an overlay order; judge whether a first graphic layer and a second graphic layer vary in a period; merge the first graphic layer with the second graphic layer when judging that the first graphic layer and the second graphic layer do not vary in the period; and display the graphic layers in order of the sequence numbers according to the sequence numbers, wherein the first graphic layer and the second graphic layer are adjacent graphic layers.

In a preferred embodiment, the invention is directed to a device for merging graphic layers. The device comprises a control circuit, a processor and a memory. The processor is installed in the control circuit. The memory is installed in the control circuit and is operatively coupled to the processor. The processor is configured to execute a program code stored in the memory to instruct a hardware composer to: receive a plurality of graphic layers in a current frame; assign sequence numbers to the graphic layers according to an overlay order; assign a weight value to each graphic layer according to a manner; establish a layer order according to the sequence numbers and the weight values; judge whether a first graphic layer and a second graphic layer vary in a period; and merge the first graphic layer with the second graphic layer when judging that the first graphic layer and the second graphic layer do not vary in the period; wherein the first graphic layer and the second graphic layer are adjacent graphic layers.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 2:
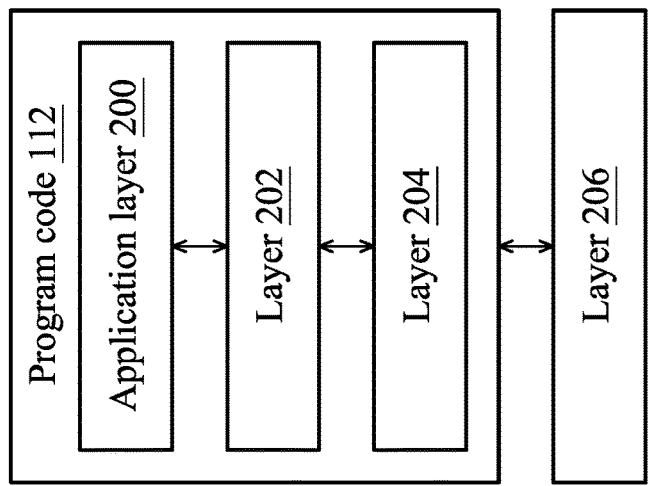
FIG. 2 is a simplified block diagram of the program code shown in FIG. 1 in accordance with one embodiment of the invention.

Several exemplary embodiments of the present disclosure are described with reference to FIGS. 1 through 8, which generally relate to a method and a device for merging graphics layers. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

Figure 1:
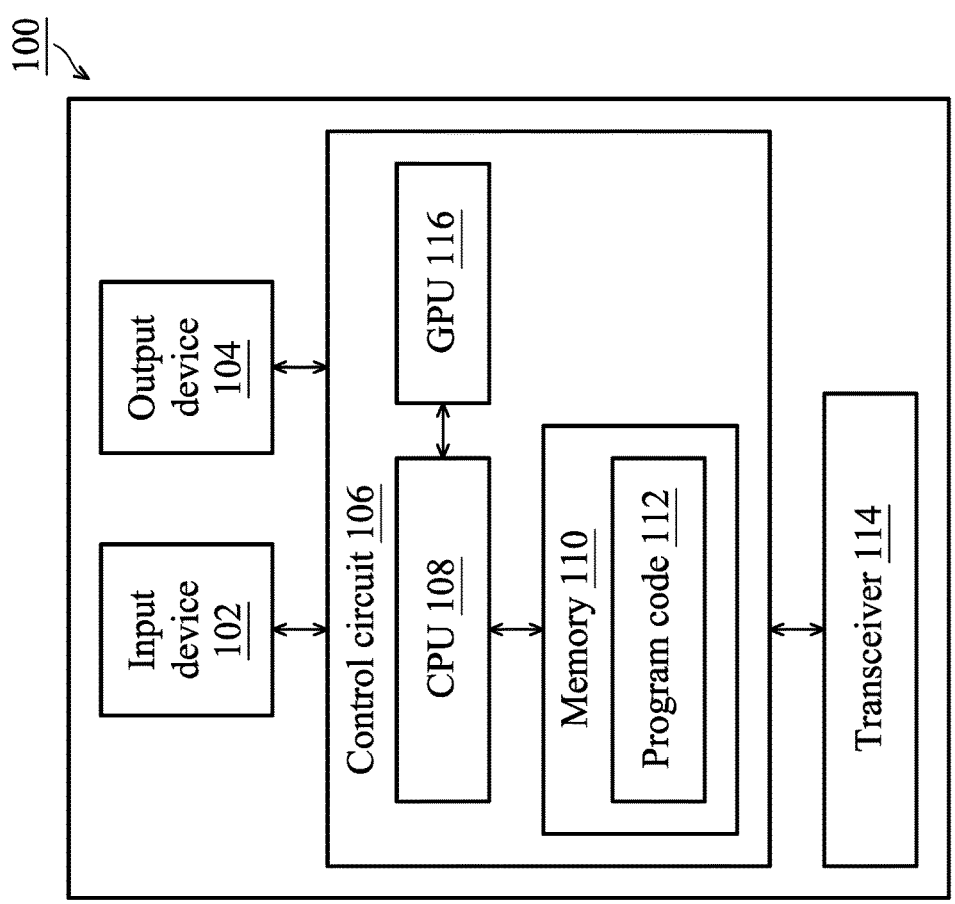
FIG. 1 shows an alternative simplified functional block diagram of a communications device according to one embodiment of the present invention.

FIG. 1 shows an alternative simplified functional block diagram of a communications device according to one embodiment of the present invention. In FIG. 1, the communication device 100 can be utilized for realizing a user equipment (UE) (or an access terminal (AT). The communications device 100 may include an input device 102, an output device 104, a control circuit 106, a central processing unit (CPU) 108, a memory 110, a program code 112, a transceiver 114, and a graphics processing unit (GPU) 116. The control circuit 106 executes the program code 112 in the memory 110 through the CPU 108, thereby controlling the operation of the communications device 100. The communications device 100 can receive signals input by a user through the input device 102, such as a keyboard keypad, touch screen, or microphone (for voice input), and can output images and sounds through the output device 104, such as a screen or speakers. The transceiver 114 is used to receive and transmit wireless signals, deliver received signals to the control circuit 106 wirelessly, and output signals generated by the control circuit 106 wirelessly.

FIG. 2 is a simplified block diagram of the program code 112 shown in FIG. 1 in accordance with one embodiment of the invention. In this embodiment, the program code 112 includes an application layer 200, a Layer 3 202, and a Layer 2 204, and is coupled to a Layer 1 206. The Layer 3 202 generally performs radio resource control. The Layer 2 204 generally performs link control. The Layer 1 206 generally performs physical connections.

The communications device provided in the embodiments of the present invention can implement methods illustrated in the embodiments of the present invention. In order to easily describe, only the related parts of the present embodiment are shown. The specific technical details are illustrated in the embodiments shown in FIGS. 3~8 of the present invention.

Figure 3:
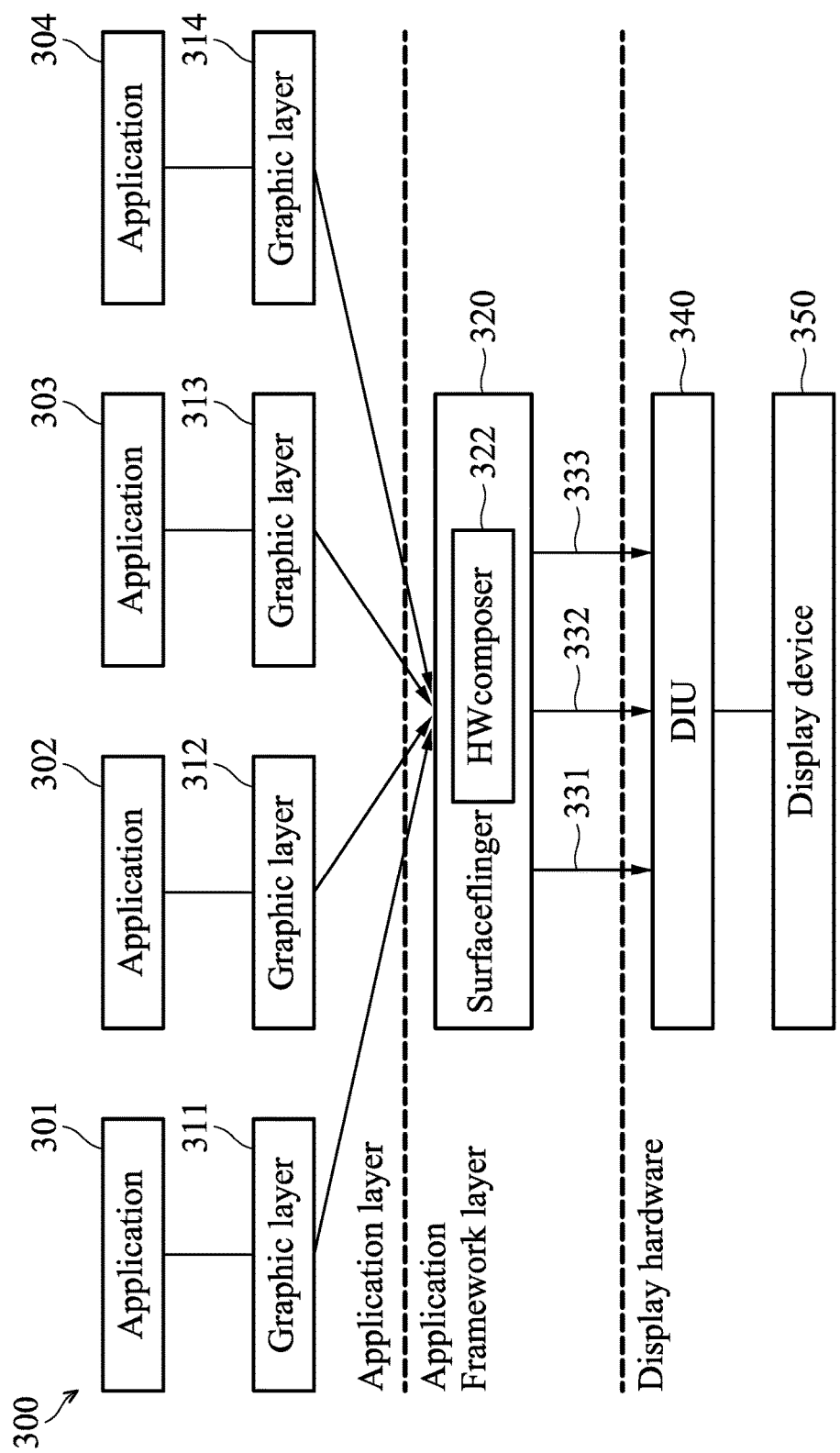
FIG. 3 is a schematic diagram of a principle framework outputting frames in an Android system according to one embodiment of the present invention.

FIG. 3 is a schematic diagram 300 of a principle framework outputting frames in an Android system according to one embodiment of the present invention. As shown in FIG. 3, in the example of the Android system, the process that a user triggers to render frames in the communications device, such as a mobile phone, through respective application programs (hereinafter, referred to as "application") and have the pictures displayed on the display screen comprises the following steps.

First, in the application layer, each application 301 to 304 performs a render operation according to its own application design. After the render operation is completed, each application transmits rendered graphic layers 311~314 to a SurfaceFlinger 320 which is responsible for refreshing the screen in an application framework layer.

Next, in the application framework layer, the system can query a display interface unit (DIU) 340 which streams may be used via a Kernel layer (not shown in FIG. 3). For example, the HWcomposer 322 queries the DIU 340 for streams 331 to 333 that can be used. The Surfaceflinger 320 processes the graphic layers according to information configured by the application to determine which layer should be put as an underlayer, which layer should be put as a top layer, which layers should use blend effects, and so on. Then, the Surfaceflinger 320 merges some graphic layers rendered by some applications together, and transmits them to the stream 331. Next, the Surfaceflinger 320 merges some of the remaining graphic layers together, and transmits them to the stream 332. Finally, the Surfaceflinger 320 merges the remaining graphic layer together, and transmits them to the stream 333. The DIU 340 receives the streams 331 to 333, and synthesizes (combines) all the streams 331 to 333 into a frame. It should be noted that, in some embodiments of the invention, the number of streams used by the DIU 340 may be extended to more than three or less than three, and the invention should not be limited to what is shown in FIG. 3.

Finally, the DIU 340 transmits the frame to a display device 350 (which includes a display controller and a display screen). For example, but not a limiting one, an LCD hardware (including an LCD controller and an LCD display screen) is used to display the final frame.

Specifically, the steps of the image processing performed by the HWcomposer 322 and the DIU 340 are that the central processing unit (CPU) of the communications device uses an algorithm to achieve synthesis strategies, and then drives a graphics processing unit (GPU) of the communications device to implement synthesis operations.

Figure 4:
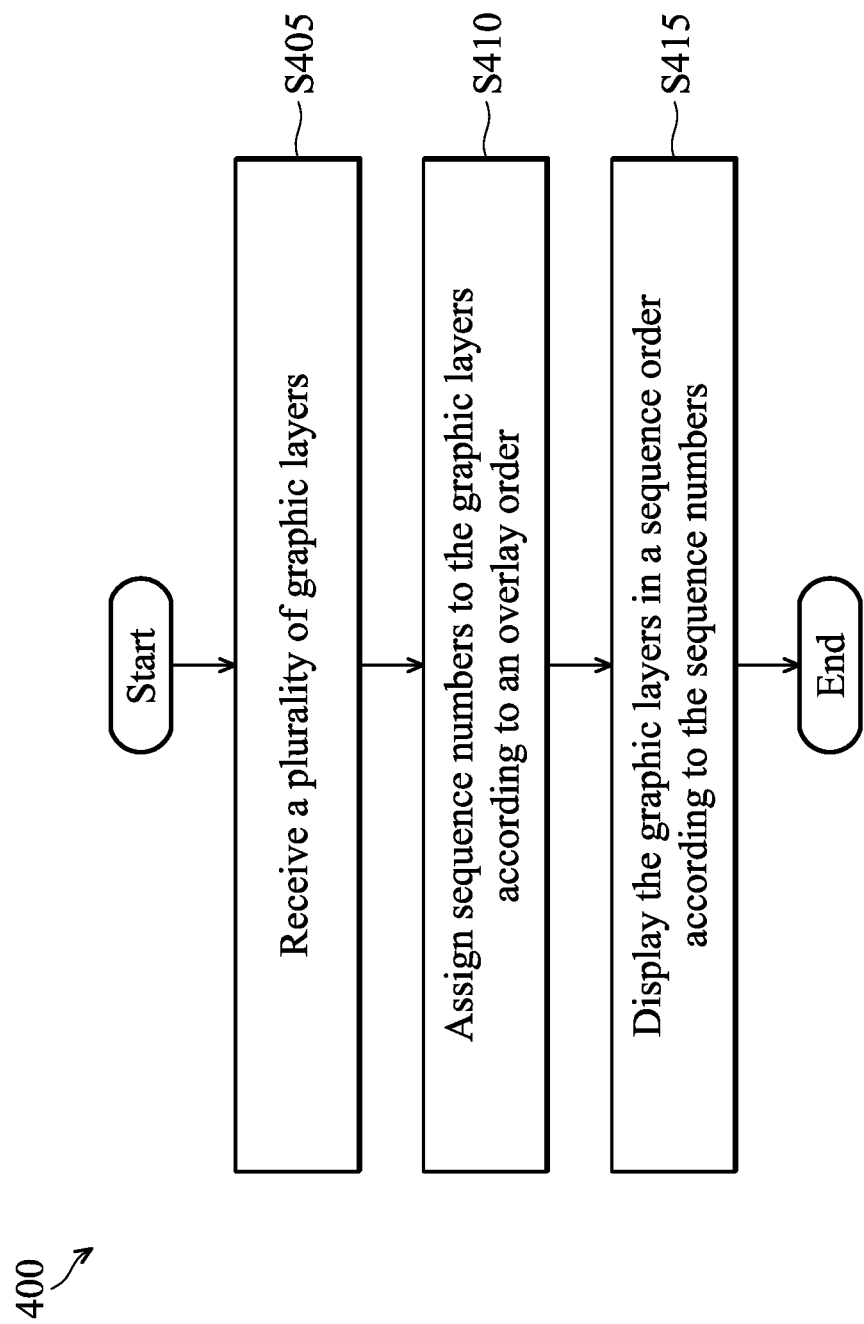
FIG. 4 is a flow chart illustrating a method for displaying graphic layers according to an embodiment of the invention.

FIG. 4 is a flow chart 400 illustrating a method for displaying graphic layers according to an embodiment of the invention. It should be noted that the method is performed by the HWcomposer 322 of the FIG. 3. In step S405, the HWcomposer receives a plurality of graphic layers drawn by at least one application. Next, in step S410, the HWcomposer assigns sequence numbers to the graphic layers according to an overlay order. In step S415, the HWcomposer displays the graphic layers in a sequence order according to the sequence numbers.

The step in which the HWcomposer assigns sequence numbers to the graphic layers according to an overlay order in step S410 can be specified as follows. The HWcomposer needs to judge whether a current graphic layer overlays any other graphic layer. When the current graphic layer does not overlay at least one graphic layer, the HWcomposer assigns an initial sequence number to the current graphic layer, wherein the initial sequence number is a minimum sequence number. Or, when the current graphic layer overlays at least one graphic layer, the HWcomposer assigns a first sequence number to the current graphic layer, wherein the first sequence number is a next sequence number after a maximum sequence number between sequence numbers of the at least one graphic layer overlaid by the current graphic layer.

Figure 5:
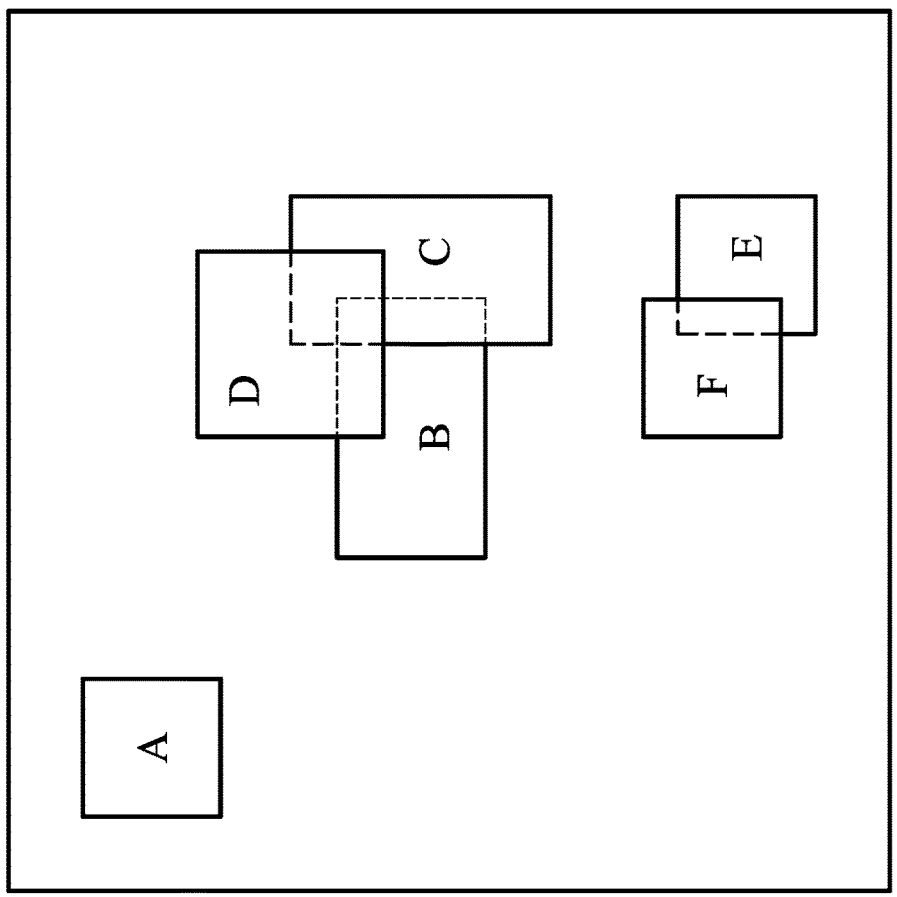
FIG. 5 is a schematic diagram illustrating that the HWcomposer assigns sequence numbers to the graphic layers according to an overlay order in accordance with one embodiment of the present invention.

FIG. 5 is a schematic diagram illustrating that the HWcomposer assigns sequence numbers to the graphic layers according to an overlay order in accordance with one embodiment of the present invention. It is assumed that the order of the source graphic layers in the Z-axis direction from low to high is A→B→C→D→E→F. As shown in FIG. 5, the graphic layer C overlays the graphic layer B, the graphic layer D overlays the graphic layers B and C, the graphic layer F overlays the graphic layer E. In FIG. 5, since the graphic layers A, B and E do not overlay other graphic layers, the HWcomposer assigns an initial sequence number 0 to the graphic layers A, B and E, wherein the initial sequence number is a minimum sequence number. The graphic layer C only overlays the graphic layer B, so the HWcomposer assigns sequence number 1 to the graphic layer C. The graphic layer D overlays the graphic layers B and C, so the HWcomposer assigns the next sequence number (i.e., sequence number 2) which is after a maximum sequence number (i.e., sequence number 1) between the sequence numbers of the graphic layers B and C overlaid by the graphic layer D. The graphic layer F only overlays the graphic layer E, so the HWcomposer assigns sequence number 1 to the graphic layer F. Therefore, the graphic layers arranged in ascending order according to the sequence numbers are A, B, E→C, F→D. It should be noted that the graphic layers with the same sequence number are not in any particular order. Therefore, for the sequence number 0, it has no effect on the HWcomposer processing the graphic layer A first or the graphic layer E first.

In one embodiment, the HWcomposer can further classify the graphic layers into a plurality of groups according to the sequence numbers, and generates a group list corresponding to each group. In this embodiment, the group lists generated by the HWcomposer according to the sequence numbers may be as shown in TABLEs 1.1~1.3. It should be noted that, in the group lists, the sequence numbers can be arranged in the Z-axis direction in ascending order.

TABLE 1.1

| Sequence number | Graphic layer |
|---|---|
| 0 | A, B, E |

TABLE 1.2

| Sequence number | Graphic layer |
|---|---|
| 1 | C, F |

TABLE 1.3

| Sequence number | Graphic layer |
|---|---|
| 2 | D |

Figure 6:
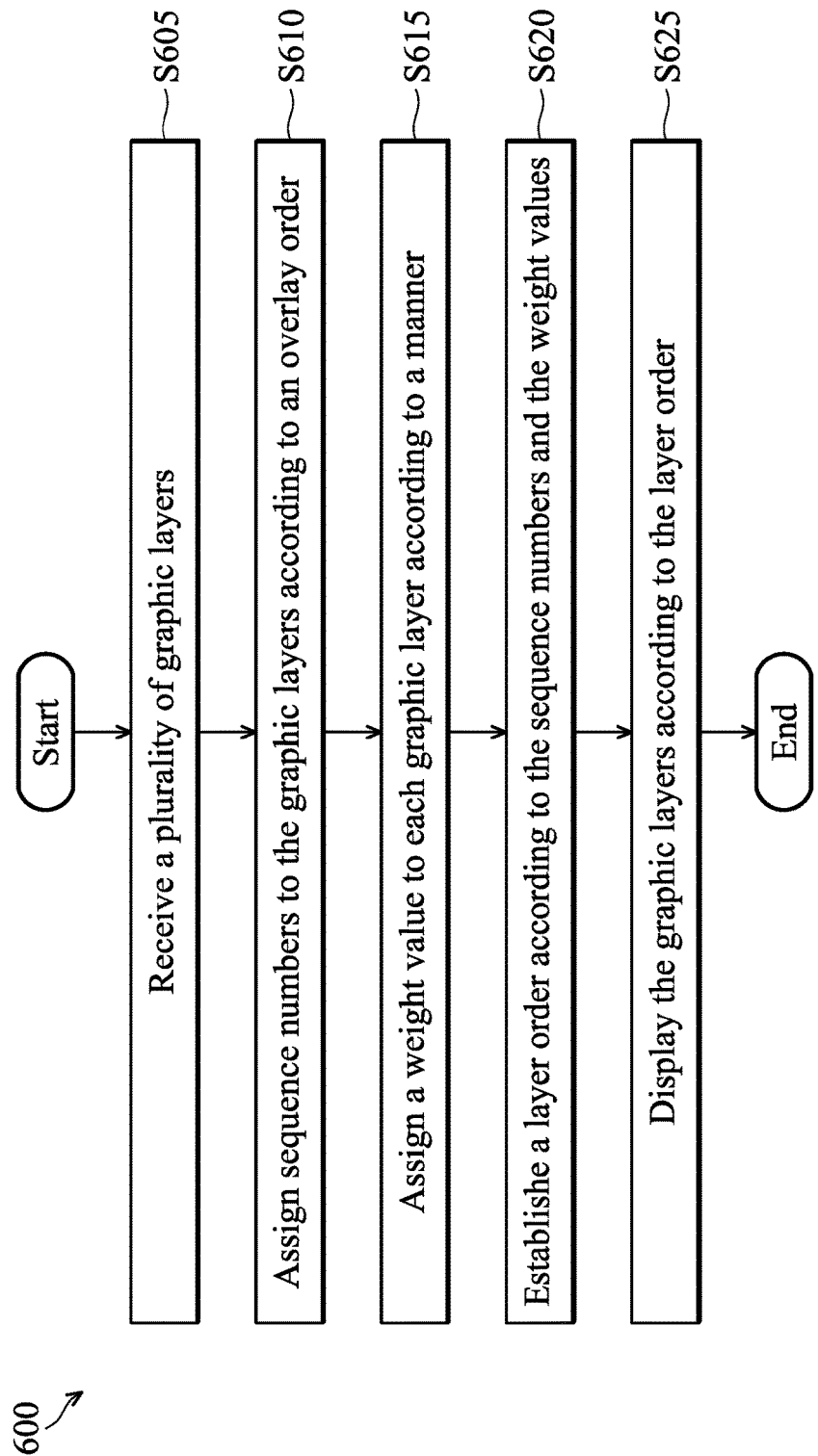
FIG. 6 is a flow chart illustrating a method for displaying graphic layers according to an embodiment of the invention.

FIG. 6 is a flow chart 600 illustrating a method for displaying graphic layers according to an embodiment of the invention. It should be noted that the method is performed by the HWcomposer 322 of the FIG. 3. In step S605, the HWcomposer receives a plurality of graphic layers drawn by at least one application. Next, in step S610, the HWcomposer assigns sequence numbers to the graphic layers according to an overlay order. In step S610, the HWcomposer assigns a weight value to each graphic layer according to a manner. In one embodiment, the HWcomposer can use a bit-block transfer (BLIT) performance to assign the weight values of the graphic layers. The lower the BLIT performance of the graphic layer, and the higher the weight, wherein the BLIT performance may be related to image format, size, or whether the graphic layer is a video image, and so on. Generally. The larger the size of the image, the harder it is to perform the BLIT. In another embodiment, the HWcomposer can judge whether two adjacent graphic layers vary. When the two adjacent graphic layers are undirty graphic layers, the HWcomposer can assign a minimum weight to the two adjacent graphic layers.

Referring back to step S620, the HWcomposer establishes a layer order according to the sequence numbers and the weight values. In step S625, the HWcomposer displays the graphic layers according to the layer order.

In this embodiment, step S610 is the same as the illustration of step S410 of FIG. 4 described above, so the details of step S610 will be omitted. The step S620 that the HWcomposer establishes the layer order according to the sequence numbers and the weight values can be described below. The HWcomposer reorders graphic layers in an initial group corresponding to the initial sequence number according to the weight values in descending order. For the remaining groups, the HWcomposer judges whether a weight value of the last graphic layer of each group list in the remaining groups is greater than a weight threshold. When the weight value of the last graphic layer in the group list is greater than the weight threshold, the graphic layers in the group list are reordered according to the weight values in descending order. When the weight value of the last graphic layer in the group list is not greater than the weight threshold, the graphic layers in the group list are reordered according to the weight values in ascending order.

As an example of FIG. 5, it is assumed that the weight values of the graphic layers A~F are 1, 2, 6, 5, 4, and 3, respectively. The HWcomposer may reorder the graphic layers of each group according to the weight values after generating the group list according to the sequence numbers. In the initial group corresponding to the initial sequence number 0, the HWcomposer reorders the graphic layers A, B and E of the initial group according to the weight values in descending order to generate a new group list, as shown in TABLE 2.1.

TABLE 2.1

| Sequence number | Graphic layer |
|---|---|
| 0 | E, B, A |

For the remaining groups, the HWcomposer needs to judge whether a weight value of the last graphic layer of each group list is greater than a weight threshold. In this example, it is assumed that the weight threshold is 3. The weight value of the last graphic layer F of a group list corresponding to the sequence number 1 in TABLE 1.2 is 3, which is not greater than the weight threshold. Therefore, the HWcomposer reorders the graphic layers C and F of the group list corresponding to the sequence number 1 according to the weight values in ascending order to generate a new group list, as shown in TABLE 2.2. Similarly, the group list corresponding to the sequence number 2 as shown in TABLE 2.3.

TABLE 2.2

| Sequence number | Graphic layer |
| --- | --- |
| 1 | F, C |

TABLE 2.3

| Sequence number | Graphic layer |
| --- | --- |
| 2 | D |

As shown in TABLEs 2.1 to 2.3 above, the layer order established by the HWcomposer according to the sequence numbers and the weight values is E, B, A→F, C→D.

In another embodiment, before displaying the graphic layers, the HWcomposer can further judge whether a layer number of the graphic layers is greater than a number of streams supported by the DIU. When the layer number is greater than the number of streams, the HWcomposer finds at least one pair of adjacent graphic layers according to the weight values and the layer order and merges the pair of adjacent graphic layers.

Take TABLEs 2.1~2.3 as an example. The layer order is E, B, A→F, C→D. It is assumed that the number of streams supported by the DIU is 4. Since the layer number is 6, the HWcomposer judges that the graphic layers need to be merged at least twice. In this example, the HWcomposer selects the graphic layers which have the minimum weight value and are adjacent to perform the merging process. In the first merging process, the HWcomposer selects the adjacent graphic layers B and A which have the weight values 2 and 1, respectively, and merges the graphic layer B with the graphic layer A. In the second merging process, the HWcomposer merges the merged graphic layer with the adjacent graphic layer F. Through this way, the HWcomposer can display the graphic layers E, C, and D which have larger weight values through an overlay manner, and display the graphic layers B, A, and F through the BLIT manner to achieve best performance.

Figure 7:
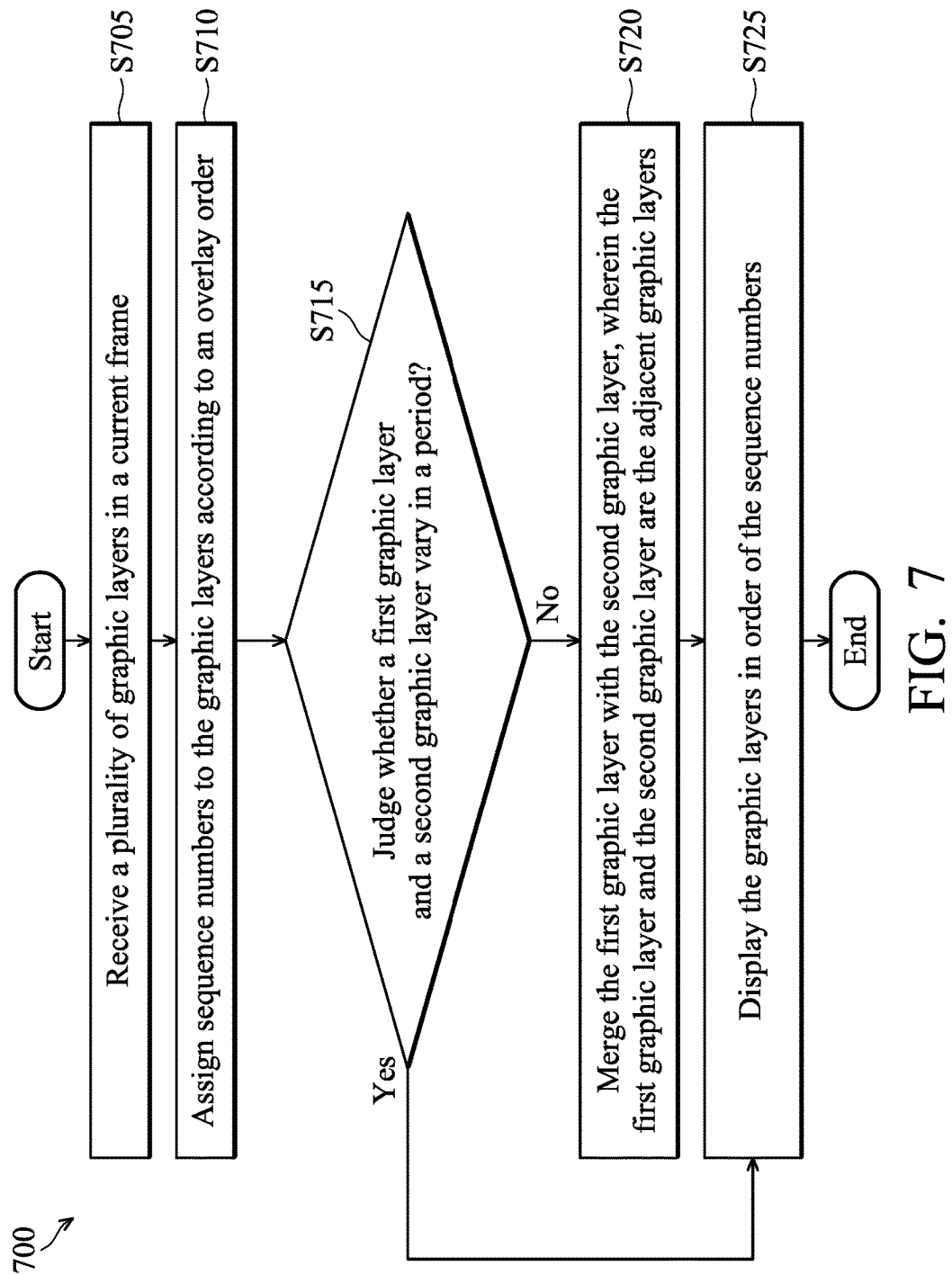
FIG. 7 is a flow chart illustrating a method for merging graphic layers according to an embodiment of the invention.

FIG. 7 is a flow chart 700 illustrating a method for merging graphic layers according to an embodiment of the invention. It should be noted that the method is performed by the HWcomposer 322 of the FIG. 3. In step S705, the HWcomposer receives a plurality of graphic layers in a current frame. In step S710, the HWcomposer assigns sequence numbers to the graphic layers according to an overlay order. In step S715, the HWcomposer judges whether a first graphic layer and a second graphic layer vary in a period. When the HWcomposer judges that the first graphic layer and the second graphic layer do not vary in the period ("No" in step S715), in step S720, the HWcomposer merges the first graphic layer with the second graphic layer, wherein the first graphic layer and the second graphic layer are the adjacent graphic layers. Finally, in step S725, the HWcomposer displays the graphic layers in order of the sequence numbers. When the HWcomposer judges that the first graphic layer and the second graphic layer vary in the period ("Yes" in step S715), in step S725, the HWcomposer does not merge the first graphic layer with the second graphic layer, and directly displays the graphic layers in order of the sequence numbers.

In this embodiment, step S710 is the same as the illustration of step S410 of FIG. 4 described above, so the details of step S710 will be omitted. It should be noted that the step S715 that the HWcomposer judges whether the first graphic layer and the second graphic layer vary in the period can be described below. The HWcomposer can judge whether receiving a geometric distortion symbol transmitted from the Surfaceflinger. When the HWcomposer does not receive the geometric distortion symbol, the HWcomposer can judge whether a buffer corresponding to the first graphic layer and a buffer corresponding to the second graphic layer vary. When judging that the buffer corresponding to the first graphic layer and the buffer corresponding to the second graphic layer do not vary, the HWcomposer judges that the first graphic layer and the second graphic layer do not vary, and then merges the first graphic layer with the second graphic layer.

Figure 8:
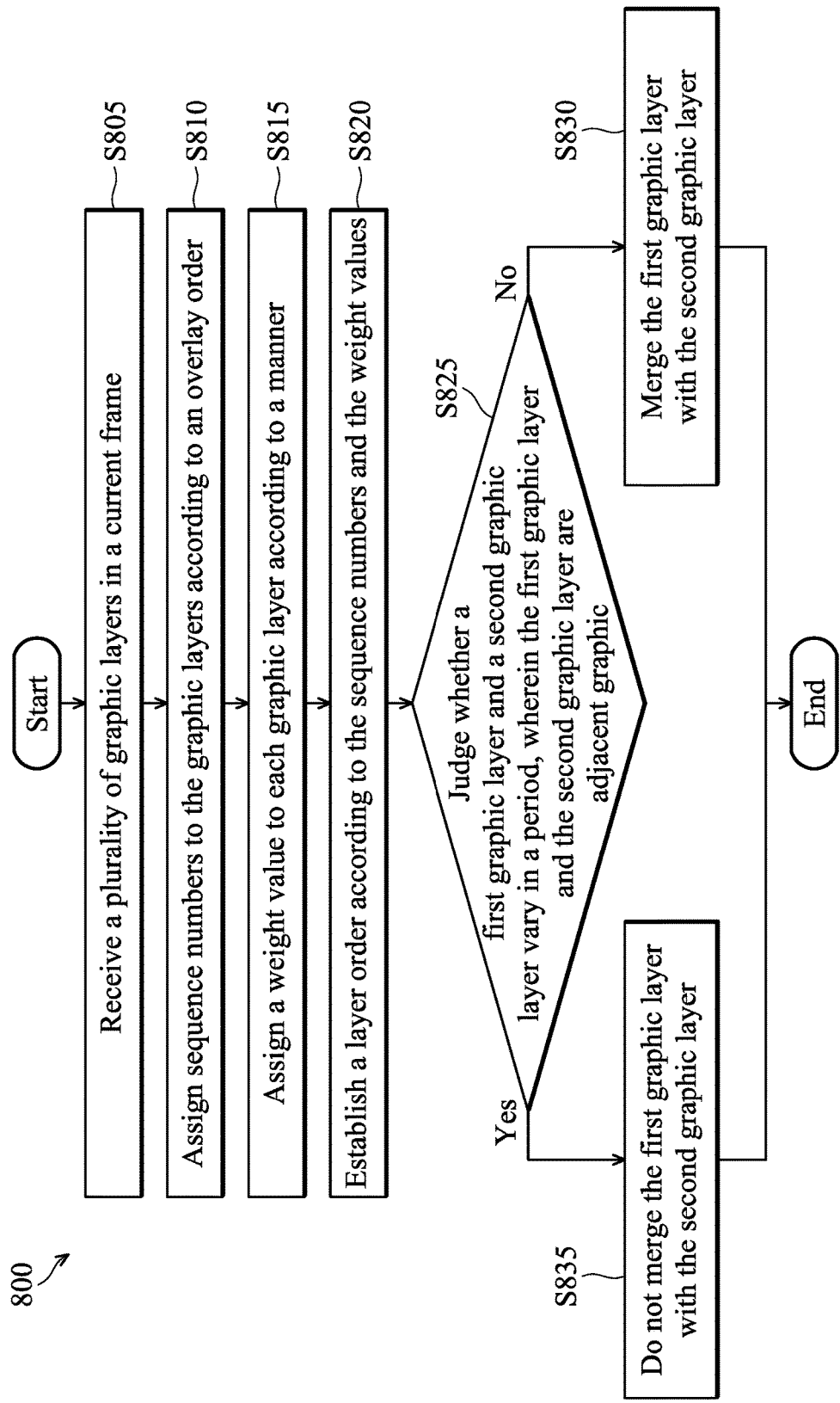
FIG. 8 is a flow chart illustrating a method for merging graphic layers according to an embodiment of the invention.

FIG. 8 is a flow chart 800 illustrating a method for merging graphic layers according to an embodiment of the invention. It should be noted that the method is performed by the HWcomposer 322 of the FIG. 3. In step S805, the HWcomposer receives a plurality of graphic layers in a current frame. In step S810, the HWcomposer assigns sequence numbers to the graphic layers according to an overlay order. In step S815, the HWcomposer assigns a weight value to each graphic layer according to a manner. In step S820, the HWcomposer establishes a layer order according to the sequence numbers and the weight values. In step S825, the HWcomposer judges whether a first graphic layer and a second graphic layer vary in a period, wherein the first graphic layer and the second graphic layer are adjacent graphic layers. When the HWcomposer judges that the first graphic layer and the second graphic layer do not vary ("No" in step S825), in step S830, the HWcomposer merges the first graphic layer with the second graphic layer. Otherwise, in step S835, the HWcomposer does not merge the first graphic layer with the second graphic layer.

In this embodiment, step S810 is the same as the illustration of step S410 of FIG. 4 described above, step S815 is the same as the illustration of step S615 of FIG. 6 described above, step S820 is the same as the illustration of step S620 of FIG. 6 described above, and step S825 is the same as the illustration of step S715 of FIG. 7 described above, so the details of step S810, 815, S820 and 825 will be omitted.

In one embodiment, before performing the flow chart 700 and the flow chart 800, the HWcomposer can further judge whether an update time exceeds a predetermined value. When the update time exceeds the predetermined value, the HWcomposer triggers to update the current frame.

By using the methods of FIG. 7 and FIG. 8, the HWcomposer can merge the undirty graphic layers. The undirty graphic layers can be displayed through a BLIT manner, and the graphic layers which vary can be displayed through an overlay manner. For example, it is assumed that there are 4 graphic layers. If the 4 graphic layers are displayed in the overlay manner, 4 streams are needed. However, if there are 3 adjacent graphic layers which are undirty graphic layers among the 4 graphic layers, the HWcomposer merely uses 2 streams to display the graphic layers. After the undirty graphic layers have been merged in the previous frame, the HWcomposer can continue to use the merged graphic layers merged in the previous frame to avoid performing the BLIT operation for improving performance and efficiency.

In addition, the central processing unit 108 can execute the program code 112 to perform all of the above-described actions and steps or others described herein.

Therefore, by using the method and device for displaying and merging graphic layers of the present invention, the operational efficiency of the device can be increased according to the overlay order and the sequence of the graphic layers adjusted in accordance with the weight values. In addition, the present invention may further merge the undirty graphic layers and set a predetermined value to update the current frame, so that the number of streams used by the DIU can be reduced effectively to achieve a power-saving effect.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for merging graphic layers, comprising:
receiving a plurality of graphic layers in a current frame;
assigning sequence numbers to the graphic layers according to an overlay order;
judging whether a first graphic layer and a second graphic layer vary in a period;
merging the first graphic layer with the second graphic layer when judging that the first graphic layer and the second graphic layer do not vary in the period; and
displaying the graphic layers in order of the sequence numbers,
wherein the first graphic layer and the second graphic layer are adjacent graphic layers;
wherein the step of judging whether the first graphic layer and the second graphic layer vary in the period further comprises:
judging whether receiving a geometric distortion symbol;
judging whether a buffer corresponding to the first graphic layer and a buffer corresponding to the second graphic layer vary when not receiving the geometric distortion symbol; and
judging that the first graphic layer and the second graphic layer do not vary when judging that the buffer corresponding to the first graphic layer and the buffer corresponding to the second graphic layer do not vary.

2. The method for merging graphic layers as claimed in claim 1, wherein the step of assigning the sequence numbers to the graphic layers according to the overlay order further comprises:
   judging whether a current graphic layer overlays any other graphic layer;
   assigning an initial sequence number to the current graphic layer when the current graphic layer does not overlay at least one graphic layer, wherein the initial sequence number is a minimum sequence number; and
   assigning a first sequence number to the current graphic layer when the current graphic layer overlays the at least one graphic layer, wherein the first sequence number is a next sequence number after a maximum sequence number between sequence numbers of the at least one graphic layer overlaid by the current graphic layer.

3. The method for merging graphic layers as claimed in claim 2, wherein the sequence numbers are assigned in ascending order.

4. The method for merging graphic layers as claimed in claim 1, further comprising:
   classifying the graphic layers into a plurality of groups according to the sequence numbers; and
   generating a respective group list corresponding to the groups.

5. The method for merging graphic layers as claimed in claim 1, before receiving the graphic layers in the current frame, the method further comprises:
   judging whether an update time exceeds a predetermined value; and
   triggering to update the current frame when the update time exceeds the predetermined value.

6. A method for merging graphic layers, comprising:
   receiving a plurality of graphic layers in a current frame;
   assigning sequence numbers to the graphic layers according to an overlay order;
   assigning a weight value to each graphic layer according to a manner;
   establishing a layer order according to the sequence numbers and the weight values;
   judging whether a first graphic layer and a second graphic layer vary in a period; and
   merging the first graphic layer with the second graphic layer when judging that the first graphic layer and the second graphic layer do not vary in the period;
   wherein the first graphic layer and the second graphic layer are adjacent graphic layers;
   wherein the step of judging whether the first graphic layer and the second graphic layer vary in the period further comprises:
   judging whether receiving a geometric distortion symbol;
   judging whether a buffer corresponding to the first graphic layer and a buffer corresponding to the second graphic layer vary when not receiving the geometric distortion symbol; and
   judging that the first graphic layer and the second graphic layer do not vary when judging that the buffer corresponding to the first graphic layer and the buffer corresponding to the second graphic layer do not vary.

7. The method for merging graphic layers as claimed in claim 6, wherein the step of assigning the sequence numbers to the graphic layers according to the overlay order further comprises:
   judging whether a current graphic layer overlays any other graphic layer;
   assigning an initial sequence number to the current graphic layer when the current graphic layer does not overlay at least one graphic layer, wherein the initial sequence number is a minimum sequence number; and
   assigning a first sequence number to the current graphic layer when the current graphic layer overlays the at least one graphic layer, wherein the first sequence number is a next sequence number after a maximum sequence number between sequence numbers of the at least one graphic layer overlaid by the current graphic layer.

8. The method for merging graphic layers as claimed in claim 7, wherein the sequence numbers are assigned in ascending order.

9. The method for merging graphic layers as claimed in claim 8, before receiving the graphic layers in the current frame, the method further comprises:
   judging whether an update time exceeds a predetermined value; and
   triggering to update the current frame when the update time exceeds the predetermined value.

10. The method for merging graphic layers as claimed in claim 7, further comprising:
    classifying the graphic layers into a plurality of groups according to the sequence numbers; and
    generating a group list corresponding to each group,
    wherein graphic layers of each group list are ranged in the z-axis direction in ascending order.

11. The method for merging graphic layers as claimed in claim 10, wherein the step of establishing the layer order according to the sequence numbers and the weight values further comprises:
    reordering graphic layers in an initial group corresponding to an initial sequence number according to the weight values in descending order;
    judging whether a weight value of a last graphic layer of a first group list in remaining groups is greater than a weight threshold;
    reordering the graphic layers of the first group list according to the weight values in descending order when the weight value of the last graphic layer is greater than the weight threshold; and
    reordering the graphic layers of the first group list according to the weight values in ascending order when the weight value of the last graphic layer is not greater than the weight threshold.

12. The method for merging graphic layers as claimed in claim 11, further comprising:
    judging whether a layer number of the graphic layers is greater than a number of streams;
    finding at least one pair of adjacent graphic layers according to the weight values and the layer order when the layer number of the graphic layers is greater than the number of streams; and
    merging the pair of adjacent graphic layers.

13. The method for merging graphic layers as claimed in claim 6, wherein the manner is a bit-block transfer (BLIT) performance.

14. The method for merging graphic layers as claimed in claim 6, wherein the manner is to judge whether the first graphic layer and the second graphic layer are undirty graphic layers.

15. A device for merging graphic layers, comprising:
    a control circuit;
    a processor installed in the control circuit; and a memory installed in the control circuit and operatively coupled to the processor;
wherein the processor is configured to execute a program code stored in the memory to instruct a hardware composer to:
receive a plurality of graphic layers in a current frame;
assign sequence numbers to the graphic layers according to an overlay order;
judge whether a first graphic layer and a second graphic layer vary in a period;
merge the first graphic layer with the second graphic layer when judging that the first graphic layer and the second graphic layer do not vary in the period; and
display the graphic layers in order of the sequence numbers according to the sequence numbers,
wherein the first graphic layer and the second graphic layer are adjacent graphic layers;
wherein the step that the hardware composer judges whether the first graphic layer and the second graphic layer vary in the period further comprises:
judging whether receiving a geometric distortion symbol;
judging whether a buffer corresponding to the first graphic layer and a buffer corresponding to the second graphic layer vary when not receiving the geometric distortion symbol; and
judging that the first graphic layer and the second graphic layer do not vary when judging that the buffer corresponding to the first graphic layer and the buffer corresponding to the second graphic layer do not vary.

16. The device for merging graphic layers as claimed in claim 15, wherein the step that the hardware composer assigns the sequence numbers to the graphic layers according to the overlay order further comprises:
judging whether a current graphic layer overlays any other graphic layer;
assigning an initial sequence number to the current graphic layer when the current graphic layer does not overlay at least one graphic layer, wherein the initial sequence number is a minimum sequence number; and
assigning a first sequence number to the current graphic layer when the current graphic layer overlays the at least one graphic layer, wherein the first sequence number is a next sequence number after a maximum sequence number between sequence numbers of the at least one graphic layer overlaid by the current graphic layer.

17. The device for merging graphic layers as claimed in claim 16, wherein the sequence numbers are assigned in ascending order.

18. The device for merging graphic layers as claimed in claim 16, wherein the processor further executes the program code to instruct the hardware composer to:
classify the graphic layers into a plurality of groups according to the sequence numbers; and
generate a respective group list corresponding to the groups.

19. The device for merging graphic layers as claimed in claim 16, before receiving the graphic layers in the current frame, the processor further executes the program code to instruct the hardware composer to:
judge whether an update time exceeds a predetermined value; and
trigger to update the current frame when the update time exceeds the predetermined value.

20. A device for merging graphic layers, comprising:
a control circuit;
a processor installed in the control circuit; and
a memory installed in the control circuit and operatively coupled to the processor;
wherein the processor is configured to execute a program code stored in the memory to instruct a hardware composer to:
receive a plurality of graphic layers in a current frame;
assign sequence numbers to the graphic layers according to an overlay order;
assign a weight value to each graphic layer according to a manner;
establish a layer order according to the sequence numbers and the weight values;
judge whether a first graphic layer and a second graphic layer vary in a period; and
merge the first graphic layer with the second graphic layer when judging that the first graphic layer and the second graphic layer do not vary in the period;
wherein the first graphic layer and the second graphic layer are adjacent graphic layers;
wherein the step that the hardware composer judges whether the first graphic layer and the second graphic layer vary in the period further comprises:
judging whether receiving a geometric distortion symbol;
judging whether a buffer corresponding to the first graphic layer and a buffer corresponding to the second graphic layer vary when not receiving the geometric distortion symbol; and
judging that the first graphic layer and the second graphic layer do not vary when judging that the buffer corresponding to the first graphic layer and the buffer corresponding to the second graphic layer do not vary.

21. The device for merging graphic layers as claimed in claim 20, wherein the step that the hardware composer assigns sequence numbers to the graphic layers according to the overlay order further comprises:
judging whether a current graphic layer overlays any other graphic layer;
assigning an initial sequence number to the current graphic layer when the current graphic layer does not overlay at least one graphic layer, wherein the initial sequence number is a minimum sequence number; and
assigning a first sequence number to the current graphic layer when the current graphic layer overlays the at least one graphic layer, wherein the first sequence number is a next sequence number after a maximum sequence number between sequence numbers of the at least one graphic layer overlaid by the current graphic layer.

22. The device for merging graphic layers as claimed in claim 21, wherein the sequence numbers are assigned in ascending order.

23. The device for merging graphic layers as claimed in claim 21, wherein the processor further executes the program code to instruct the hardware composer to:
classify the graphic layers into a plurality of groups according to the sequence numbers; and
generate a group list corresponding to each group,
wherein graphic layers of each group list are ranged in the z-axis direction in ascending order.

24. The device for merging graphic layers as claimed in claim 23, wherein the step that the hardware composer establishes the layer order according to the sequence numbers and the weight values further comprises:
reordering graphic layers in an initial group corresponding to the initial sequence number according to the weight values in descending order;

judging whether a weight value of a last graphic layer of a first group list in remaining groups is greater than a weight threshold;

reordering the graphic layers of the first group list according to the weight values in descending order when the weight value of the last graphic layer is greater than the weight threshold; and reordering the graphic layers of the first group list according to the weight values in ascending order when the weight value of the last graphic layer is not greater than the weight threshold.

25. The device for merging graphic layers as claimed in claim 24, wherein the processor further executes the program code to instruct the hardware composer to:

judge whether a layer number of the graphic layers is greater than a number of streams;

find at least one pair of adjacent graphic layers according to the weight values and the layer order when the layer number of the graphic layers is greater than the number of streams; and merge the pair of adjacent graphic layers.

26. The device for merging graphic layers as claimed in claim 20, wherein the manner is a bit-block transfer (BLIT) performance.

27. The device for merging graphic layers as claimed in claim 20, wherein the manner is to judge whether the first graphic layer and the second graphic layer are undirty graphic layers.

28. The device for merging graphic layers as claimed in claim 20, before receiving the graphic layers in the current frame, the processor further executes the program code to instruct the hardware composer to:

judge whether an update time exceeds a predetermined value; and trigger to update the current frame when the update time exceeds the predetermined value.

* * * * *